United States Patent [19]
Stebnicki

[11] Patent Number: 5,816,390
[45] Date of Patent: *Oct. 6, 1998

[54] CONVEYOR PIN RETENTION SYSTEM USING OFFSET OPENINGS

[76] Inventor: James C. Stebnicki, 4925 N. Anita Ave., Whitefish Bay, Wis. 53217

[ * ] Notice: The term of this patent shall not extend beyond the expiration date of Pat. No. 5,573,106.

[21] Appl. No.: 596,454

[22] Filed: Feb. 5, 1996

[51] Int. Cl.⁶ .................................................. B65G 17/06
[52] U.S. Cl. .......................................................... 198/853
[58] Field of Search ............................................ 198/853

[56] References Cited

U.S. PATENT DOCUMENTS

| | | | |
|---|---|---|---|
| 4,858,753 | 8/1989 | Hodlewsky | 198/853 |
| 4,949,838 | 8/1990 | Lapeyre et al. | 198/853 |
| 4,972,942 | 11/1990 | Faulkner | 198/853 |
| 5,020,656 | 6/1991 | Faulkner | 198/494 |
| 5,105,938 | 4/1992 | Tan | 198/853 |
| 5,156,262 | 10/1992 | Horton | 198/834 |
| 5,332,084 | 7/1994 | Greve | 198/853 |
| 5,547,071 | 8/1996 | Palmaer et al. | 198/853 |
| 5,566,817 | 10/1996 | Meeker | 198/853 X |
| 5,573,106 | 11/1996 | Stebnicki | 198/853 |

Primary Examiner—David A. Bucci

[57] ABSTRACT

Disclosed herein is a conveyor including a first conveyor element having an end comprising a series of eyes spaced from each other, defining therebetween a series of spaces, and including a sub-series of centrally located eyes respectively including therein openings aligned with respect to each other, and an end eye adjacent one end of the sub-series of centrally located eyes and including therein an opening located in partial registry with the openings of the sub-series of centrally located eyes and including an abutment area located within an extended projection of the openings of the sub-series of centrally located eyes, a second conveyor element including an end comprising a series of eyes spaced from each other, extending into the spaces between the eyes of the first conveyor element, defining therebetween a series of spaces receiving the eyes of the first conveyor element, and respectively including therein openings aligned with respect to each other and with respect to the openings of the sub-series of the centrally located eyes of the first conveyor element, and a hinge pin including a central portion extending in the openings of the sub-series of centrally located eyes of the first conveyor element and in the openings of the eyes of the second conveyor element, and an end located adjacent the end eye of the first conveyor element and in interfering alignment with the abutment area of the end eye of the first conveyor element.

9 Claims, 1 Drawing Sheet

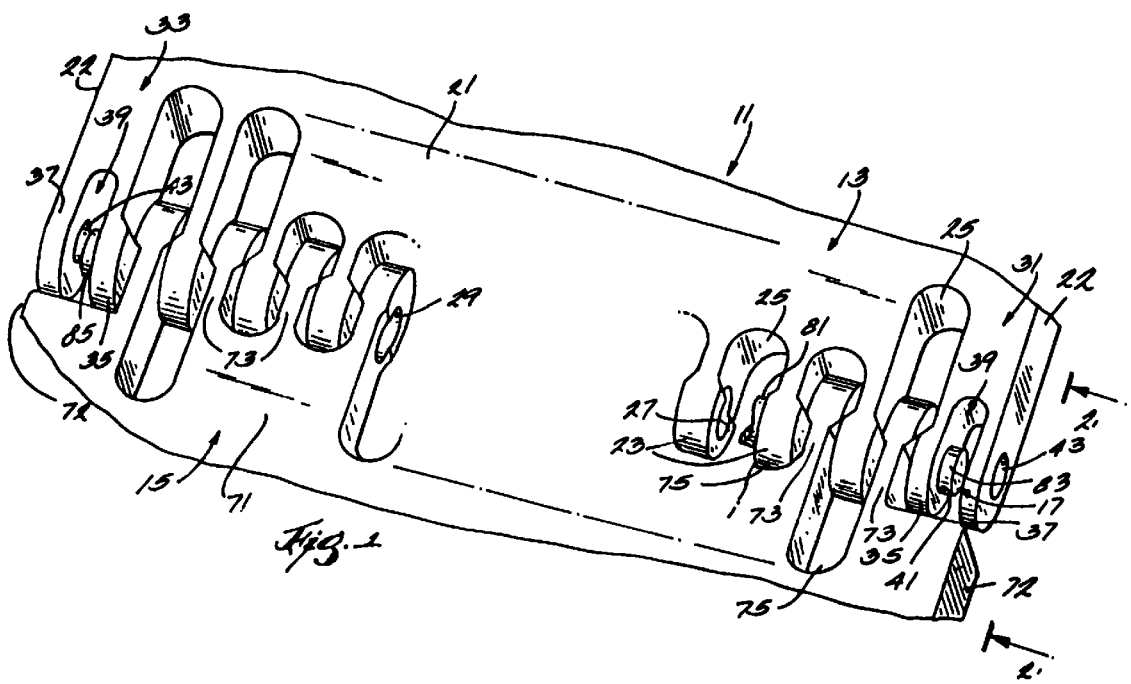
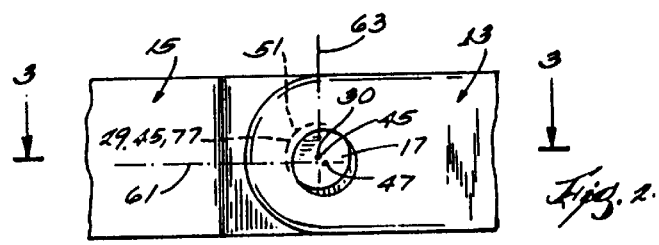
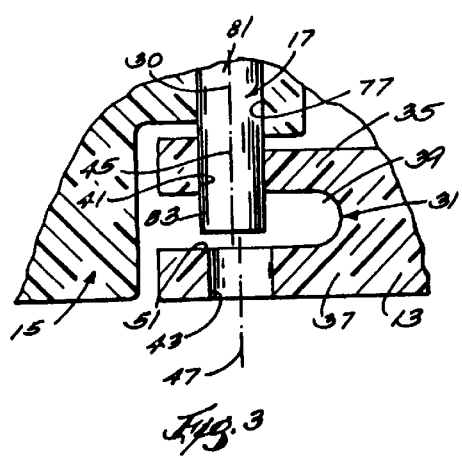

CONVEYOR PIN RETENTION SYSTEM USING OFFSET OPENINGS

BACKGROUND OF THE INVENTION

The invention relates generally to belt, chain, or conveyor construction, and, in particular, to systems or arrangements for preventing unwanted axial migration of a hinge pin connecting two adjacent belt, chain, or conveyor elements.

More specifically, the axial loads on a hinge pin in a belt, chain, or conveyor are such that a hinge pin retention system is needed to prevent the hinge pin from axially migrating and forcing its way out of engagement with the axially adjacent elements of the belt, chain, or conveyor.

In the past, plugs, or headed pins, or hooded link extensions have been employed to prevent axial hinge pin movement.

Attention is directed to the following U.S. Pat. Nos.:

4,858,753, issued Aug. 22, 1989

4,949,838, issued Aug. 21, 1990

4,972,942, issued Nov. 27, 1990

5,020,656, issued Jun. 4, 1991

5,105,938, issued Apr. 21, 1992

5,156,262, issued Oct. 20, 1992

5,332,084, issued Jun. 26, 1994

SUMMARY OF THE INVENTION

The invention provides a conveyor comprising a first conveyor element including an end comprising a series of eyes spaced from each other, defining therebetween a series of spaces, and including a sub-series of centrally located eyes respectively including therein openings aligned with respect to each other, and, an end eye adjacent one end of the sub-series of centrally located eyes and including therein an opening located in partial registry with the openings of the sub-series of centrally located eyes and including an abutment area located within an extended projection of the openings of the sub-series of centrally located eyes, a second conveyor element including an end comprising a series of eyes spaced from each other, extending into the spaces between the eyes of the first conveyor element, defining therebetween a series of spaces receiving the eyes of the first conveyor element, and respectively including therein openings aligned with respect to each other and with respect to the openings of the sub-series of the centrally located eyes of the first conveyor element, and a hinge pin including a central portion extending in the openings of the sub-series of centrally located eyes of the first conveyor element and in the openings of the eyes of the second conveyor element, and an end located adjacent the end eye of the first conveyor element and in interfering alignment with the abutment area of the end eye of the first conveyor element.

The invention also provides a conveyor comprising a first conveyor element including an end comprising a series of eyes spaced from each other, defining therebetween a series of spaces, and including a sub-series of centrally located eyes respectively including therein openings having aligned axes, and an end eye adjacent one end of the sub-series of centrally located eyes and including therein a central slot defining an inner eye portion having therein an opening with an axis in alignment with the axes of the openings in the sub-series of centrally located eyes, and an outer eye portion having therein an opening with an axis located in spaced relation from the axis of the sub-series of centrally located openings of the first conveyor element and including an abutment area located within an extended projection of the openings of the sub-series of centrally located eyes, a second conveyor element including an end comprising a series of eyes spaced from each other, extending into the spaces between the eyes of the first conveyor element, defining therebetween a series of spaces receiving the eyes of the first conveyor element, and respectively including therein openings aligned with respect to each other and with respect to the openings of the sub-series of the centrally located eyes of the first conveyor element, and a hinge pin including a central portion extending in the openings of the sub-series of centrally located eyes of the first conveyor element, in the openings of the eyes of the second conveyor element, and in the opening of the inner eye portion of the end eye, and an end located adjacent the outer portion of the end eye of the first conveyor element and in interfering alignment with the abutment area of the outer portion of the end eye of the first conveyor element.

The invention also provides a conveyor comprising a first conveyor element including an end comprising a series of eyes spaced from each other, defining therebetween a series of spaces, and including a sub-series of centrally located eyes respectively including therein openings aligned with respect to each other, a first end eye adjacent one end of the sub-series of centrally located eyes and including therein a central slot defining an inner eye portion having therein an opening with an axis in alignment with the axes of the openings in the sub-series of centrally located eyes, and an outer eye portion having therein an opening with an axis located in spaced relation from the axis of the sub-series of centrally located openings of the first conveyor element and including an abutment area located within an extended projection of the openings of the sub-series of centrally located eyes, a second end eye adjacent the other end of the sub-series of centrally located eyes and including therein a central slot defining an inner eye portion having therein an opening with an axis in alignment with the axes of the openings in the sub-series of centrally located eyes, and an outer eye portion having therein an opening with an axis located in spaced relation from the axis of the sub-series of centrally located openings of the first conveyor element and including an abutment area located within an extended projection of the openings of the sub-series of centrally located eyes, a second conveyor element including an end comprising a series of eyes spaced from each other, extending into the spaces between the eyes of the first conveyor element, defining therebetween a series of spaces receiving the eyes of the first conveyor element, and respectively including therein openings aligned with respect to each other and with respect to the openings of the sub-series of the centrally located eyes of the first conveyor element, and a hinge pin including a central portion extending in the openings of the sub-series of centrally located eyes of the first conveyor element, in the openings of the eyes of the second conveyor element, and in the openings of the inner portions of the first and second eyes, a first end located adjacent the outer portion of the first end eye of the first conveyor element and in interfering alignment with the abutment area of the outer portion of the first end eye of the first conveyor element, and a second end located adjacent the outer portion of the second end eye of the first conveyor element and in interfering alignment with the abutment area of the outer portion of the second end eye of the first conveyor element.

Other features and advantages of the invention will become apparent to those skilled in the art upon review of the following detailed description, claims and drawings.

DESCRIPTION OF THE DRAWINGS

FIG. 1 is a fragmentary perspective view of a conveyor embodying various of the features of the invention.

FIG. 2 is a fragmentary end view taken along line 2—2 of FIG. 1.

FIG. 3 is a fragmentary sectional view taken along line 3—3 of FIG. 2.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in FIG. 1 is a track assembly or belt or conveyor 11 which comprises first and second elements or belts or tracks or links 13 and 15, respectively, and a hinge pin 17 pivotally connecting the first and second conveyor elements or links 13 and 15. The invention is applicable to any type of track assembly or conveyor, and, except as noted hereinafter, the conveyor elements can take any conventional form and can be fabricated of any suitable material.

The first conveyor element 13 can be fabricated of any suitable plastic or other material which is preferable resiliently flexible and includes laterally spaced and generally rectilinearly extending sides 22, together with a first end 21 located between the sides 22 and comprising a first series of eyes 23 which are spaced from each other, which define therebetween a series of spaces 25, and which include a sub-series of centrally located eyes 27 respectively including therein openings or holes 29 aligned with respect to each other and having a given diameter or dimension. Preferably, the openings or holes 29 are cylindrical, have a common axis 30, and have a common diameter. The end 21 of the first conveyor element or link 13 also includes a first end eye 31 adjacently spaced from one end of the sub-series of centrally located eyes 27 and a second end eye 33 adjacently spaced from the other end of the sub-series of centrally located eyes 27.

In the preferred construction, each of the first and second end eyes 31 and 33 is split or bifurcated, i.e., respectively include axially spaced inner and outer eye portions 35 and 37 defining therebetween a central slot affording an open space enabling viewing of the slot 39 so as to permit determination of the presence therein of the hinge pin 17.

The axially spaced end eye inner and outer portions 35 and 37 respectively include therein inner and outer openings or holes 41 and 43 which are generally cylindrical in shape and which have a common diameter. The openings or holes 41 in the inner end eye portions 35 have respective axes 45 in alignment with the axis 30 of the openings or holes 29 in the sub-series of centrally located eyes 27 and have diameters substantially equal to the diameters of the openings or holes 29. The openings or holes 43 in the outer end eye portions 37 are cylindrical and have respective axes 47 located in eccentric or spaced relation from the axis 30 of the sub-series of centrally located openings 29 of the first conveyor element 13 and includes an abutment 51 area located within a projection of the openings 29 of the sub-series of centrally located eyes 27.

While other arrangements can be employed, in the disclosed construction, the axes 47 of the openings 43 in the outer end eye portions 37 of the first and second end eyes 31 and 33 are preferable located in spaced or offset relation from the axis 30 of the openings 29 in the sub-series of centrally located eyes 27 and from the axes 45 of the openings 41 in the inner end eye portions 31 and 33 at a short distance in the pitch direction or direction of travel 61 of the conveyor 11, and are also located in spaced or offset relation from the axis 45 of the openings 41 in the inner end eye portions 35 and from the axes 45 of the openings 41 in the inner end eye portions 31 and 33 at a short distance in the direction 63 of chain or conveyor height, i.e., in the direction 63 perpendicular to the pitch direction or direction 61 of conveyor travel. However, if desired, the openings 43 in the outer end eye portions 37 of the first and second end eyes 31 and 33 could be offset in only one direction from the axis 30 of the openings 29 in the sub-series of centrally located eyes 27 and from the axes 45 of the openings 41 in the inner end eye portions 31 and 33 of the first and second end eyes 31 and 33.

The offset in the pitch direction 61 prevents the hinge pin 17 from walking axially when the conveyor 11 is in either of tension and compression. The offset in the direction 63 of conveyor height prevents the hinge pin 17 from walking axially when the conveyor 11 experiences height variations between adjacent links or elements 13 and 15.

While the disclosed construction has been described with offset openings 43 in the outer end portions 37 of both the first and second end eyes 31 and 33, at least some of the advantages of the invention can be obtained when only the outer end eye portion 37 of one of the first and second end eyes 31 and 33 is offset.

The second conveyor element or link 15 can be fabricated of any suitable plastic, metallic, or other material and includes laterally spaced and generally rectilinearly extending sides 72, together with an end 71 located between the sides 72 and comprising a series of eyes 73 spaced axially or transversely from each other, extending into the spaces 25 between the eyes 23 of the first conveyor element or link 13, and defining therebetween another series of spaces 75 receiving the centrally located sub series of eyes 23 of the first conveyor element or link 13. The eyes 73 respectively include therein openings or bores 77 aligned with respect to each other and with respect to the openings 29 of the sub-series of centrally located eyes 27 of the first conveyor element or link 13.

The hinge pin 17 can be fabricated of any suitable plastic, metallic or other material which can be resiliently flexible, is generally cylindrical, and has a diameter only slightly less than the diameter of the openings 43 in the outer end eye portions 37 of the end eyes 31 and 33 of the first conveyor element or link 13. The hinge pin 17 includes a central portion 81 extending in the openings 29 of the sub-series of centrally located eyes 27 of the first conveyor element or link 13, in the openings 77 of the eyes 73 of the second conveyor element or link 15, and in the openings 41 of the inner end eye portions 35 of the first and second eyes 31 and 33.

In addition, the hinge pin 17 includes a first end 83 located adjacent the outer end eye portion 37 of the first end eye 31 of the first conveyor element or link 13 and in interfering alignment with the abutment area 51 of the outer end eye portion 37 of the first end eye 31 of the first conveyor element or link 13.

The hinge pin 17 also includes a second end 85 located adjacent the outer end eye portion 37 of the second end eye 33 of the first conveyor element or link 13 and in interfering alignment with the abutment area 51 of the outer end eye portion 37 of the second end eye 33 of the first conveyor element or link 13.

The axial length of the hinge pin 17 is slightly less than the distance between the outer end eye portions 37 of the first conveyor element or link 13.

If the first conveyor element or link 13 is fabricated from resilient material, then the hinge pin 17 need not be resilient. Conversely, if the hinge pin 17 is fabricated of resilient material, then the first conveyor element or link 13 need not be resilient.

In assembly of the conveyor 11, the first and second conveyor elements or links 13 and 15 are assembled with the centrally located eyes 27 of the first conveyor element or link 13 in the spaces 75 of the second conveyor element or link 15 and with the eyes 73 of the second conveyor element or link 15 in the spaces 25 of the first conveyor element or link 13 so as to locate the openings 29 and 77 in axial alignment. Thereafter, one of the ends 83 and 85 of the hinge pin 17 is inserted through the opening 47 in the outer end eye portion 37 of the first end eye 31 of the first conveyor element 13, through the opening 45 in the inner end eye portion 35 of the first end eye 31 of the first conveyor element 13, through the openings 29 and 77 respectively located in the centrally located series of eyes 27 in the first conveyor element 13 and in the eyes 73 of the second conveyor element 15, and then through the opening 41 in the inner end eye portion 35 of the second end eye 33 of the first conveyor element 13, and into abutting engagement of the inserted end of the hinge pin 17 with the abutment area 51 of the outer end eye portion 37 of the second end eye 33 of the first conveyor element 13, thus blocking migration of the hinge pin 17 in one axial direction. Such engagement withdraws the other of the ends 83 and 85 of the hinge pin 17 from the opening 43 in the outer end eye portion 37 of the first end eye 31 of the first conveyor element 13 and into position for abutting engagement of the other end 85 of the hinge pin 17 with the abutment area 51 of the outer end eye portion 37 of the first end eye 31 of the first conveyor element or link 13, thus blocking axial walking of the hinge pin 17 in the other axial direction. Such abutments hold the hinge pin 17 in place and prevent axial outward movement or walking of the hinge pin 17 relative to the assembled first and second conveyor elements or links 13 and 15.

Such insertion of the hinge pin 17 into the recited openings is accomplished by bending or deflecting the hinge pin 17 and/or the outer eye portion 37 of the end eye and is made possible by the resilience of the hinge pin and/or of the first conveyor element or link.

Accordingly, the use of the offset openings 43 in the outer end eye portions 37 of the end eyes 31 and 33 of the first conveyor element or link 13 prevents the hinge pin 17 from axially walking out of assembled relation to the connected conveyor elements or links 13 and 15. Furthermore, such prevention is accomplished without using additional parts other than the hinge pin itself and one of the connected conveyor elements or links 13 and 15.

The split or bifurcated end eyes 31 and 33 allow for visual inspection for proper assembly, cleanliness, and pin wear, and for easy access to afford disassembly when desired.

As already noted the hinge pin 17 is generally cylindrical and thus does not require any special geometry modification or secondary fabrication operation. In addition, the disclosed construction does not require any special tool for assembly of the conveyor 11. Still further, the disclosed construction serves to physically block the hinge pin 17 in two mutually perpendicularly related directions.

Various of the features are set forth in the following claims.

I claim:

1. A conveyor comprising a first conveyor element including an end comprising a series of eyes spaced from each other, defining therebetween a series of spaces, and respectively having therein openings with axes aligned with respect to each other, and a second conveyor element including an end comprising a series of eyes spaced from each other, defining therebetween a series of spaces receiving said eyes of said first conveyor element, and including a sub-series of centrally located eyes extending into said spaces between said eyes of said first conveyor element and respectively having therein openings with axes aligned with respect to each other and with respect to said axes of said openings of said eyes of said first conveyor element, and an end eye adjacent one end of said sub-series of centrally located eyes and including therein a central slot which is open along the direction of intended first conveyor element travel, which is unoccupied by one of said eyes of said first conveyor element, and which defines an inner eye portion having therein an opening with an axis in alignment with said axes of said openings in said sub-series of centrally located eyes, and an outer eye portion having an outer perimeter, an opening located in inwardly spaced relation to said outer perimeter, having an axis located in spaced relation from said axis of said sub-series of centrally located openings of said second conveyor element, and an abutment area located within an extended projection of said openings of said sub-series of centrally located eyes, and a hinge pin including a central portion extending in said openings of said sub-series of centrally located eyes of said second conveyor element, in said openings of said eyes of said first conveyor element, and in said opening of said inner eye portion of said end eye, and an end located adjacent said outer portion of said end eye of said second conveyor element and in interfering alignment with said abutment area of said outer portion of said end eye of said second conveyor element.

2. A conveyor in accordance with claim 1 wherein said openings in said eyes of said first conveyor element, said openings in said sub-series of eyes of said second conveyor element, said opening in said inner eye portion of said second conveyor element, and said opening in said outer eye portion of said end eye of said second conveyor element are generally cylindrical and have a diameter, and wherein said hinge pin is cylindrical and has a diameter slightly less than said diameter of said openings in said eyes in said first conveyor element, in said sub-series of eyes of said second conveyor element, in said inner eye portion of said second conveyor element, and in said outer eye portion of said second conveyor element.

3. A conveyor in accordance with claim 1 wherein at least one of said second conveyor element and said hinge pin is fabricated of resiliently flexible material.

4. A conveyor in accordance with claim 1 wherein said opening in said outer eye portion of said eye of said second conveyor element has an axis located in spaced relation from said axis of said opening in said inner eye portion of said end eye of said second conveyor element in two directions located in perpendicular relation to each other.

5. A conveyor comprising a first conveyor element including an end comprising a series of eyes spaced from each other, defining therebetween a series of spaces, and respectively including therein openings aligned with respect to each other, a second conveyor element including an end comprising a series of eyes spaced from each other, extending into said spaces between said eyes of said first conveyor element, defining therebetween a series of spaces receiving said eyes of said first conveyor element, and including a sub-series of centrally located eyes respectively including therein openings aligned with respect to each other and with respect to said openings of said eyes of said first conveyor element, a first end eye adjacent one end of said sub-series of centrally located eyes and including therein a central slot which is open along the direction of intended first conveyor element travel, which is unoccupied by one of said eyes of said first conveyor element, and which defines an inner eye portion having therein an opening with an axis in alignment with said axes of said openings in said sub-series of centrally located eyes, and an outer eye portion having an outer perimeter, an opening located in inwardly spaced relation to said outer perimeter, having an axis located in spaced relation from said axis of said sub-series of centrally located openings of said second conveyor element, and an abutment area located within an extended projection of said openings of said sub-series of centrally located eyes, and a second end eye adjacent the other end of said sub-series of centrally located eyes and including therein a central slot which is open along the direction of intended first conveyor element travel, which is unoccupied by one of said eyes of said first conveyor element, and which defines an inner eye portion having therein an opening with an axis in alignment with said axes of said openings in said sub-series of centrally located eyes, and an outer eye portion having an outer perimeter, an opening located in inwardly spaced relation to said outer perimeter, having an axis located in spaced relation from said axis of said sub-series of centrally located openings of said second conveyor element, and an abutment area located within an extended projection of said openings of said sub-series of centrally located eyes, and a hinge pin including a central portion extending in said openings of said sub-series of centrally located eyes of said second conveyor element, in said openings of said eyes of said first conveyor element, and in said openings of said inner portions of said first and second eyes, a first end located adjacent said outer portion of said first end eye of said second conveyor element and in interfering alignment with said abutment area of said outer portion of said first end eye of said second conveyor element, and a second end located adjacent said outer portion of said second end eye of said second conveyor element and in interfering alignment with said abutment area of said outer portion of said second end eye of said second conveyor element.

6. A conveyor in accordance with claim 5 wherein said openings in said inner eye portions of first and second end eyes of said second conveyor element are in alignment.

7. A conveyor in accordance with claim 5 wherein said openings in said outer eye portions of said first and second end eyes of said second conveyor element have respective axes located in spaced relation from said axes of said openings in said inner eye portions of said first and second end eyes of said second conveyor element in two directions located in perpendicular relation to each other.

8. A conveyor in accordance with claim 5 wherein said hinge pin is fabricated of resiliently flexible material.

9. A conveyor in accordance with claim 5 wherein said openings in said outer eye portions of said end eyes of said second conveyor element are generally cylindrical and have a diameter, and wherein said hinge pin is cylindrical and has a diameter slightly less than said diameter of said openings in said outer eye portions of said end eyes of said second conveyor element.

\* \* \* \* \*